United States Patent [19]

Harms

[11] 3,720,322

[45] March 13, 1973

[54] UPFLOW CARTRIDGE FILTER APPARATUS

[76] Inventor: John F. Harms, 705 Waterway Drive, North Palm Beach, Fla. 33403

[22] Filed: Dec. 31, 1970

[21] Appl. No.: 103,165

[52] U.S. Cl. ..................................................210/238
[51] Int. Cl. ..............................................B01d 29/30
[58] Field of Search......................210/232, 238, 323

[56] References Cited

UNITED STATES PATENTS

| | | | |
|---|---|---|---|
| 2,859,876 | 11/1958 | Brundage | 210/323 |
| 2,921,686 | 1/1960 | Forman et al. | 210/323 |
| 3,498,464 | 3/1970 | Frosolone | 210/493 |
| 3,394,815 | 7/1968 | Harms et al. | 210/323 |
| 3,503,516 | 3/1970 | Harms et al. | 210/323 |
| 2,316,206 | 4/1943 | Wilson | 210/323 |
| 3,431,709 | 3/1969 | Kawanami | 210/323 X |

*Primary Examiner*—Reuben Friedman
*Assistant Examiner*—F. F. Calvetti
*Attorney*—Hugh Adam Kirk

[57] ABSTRACT

A pressure filter having a pressure vessel comprising an open top lower tank section adapted to be closed by a removable dome-shaped upper cover section, and an apertured filter support plate therebetween which divides the lower and upper sections into two chambers. A continuous rim gasket of substantially V-shaped cross-section mounted on the peripheral margin of the aperture plate seals the two chambers. The upper face of the apertured plate is provided with a handle means which cooperates with the domed cover section to press an outlet opening therein into a sealed engagement with the upper open end of an outlet pipe which passes through the lower chamber. A plurality of filter elements are individually and sealingly supported through the other openings or apertures in the apertured plate.

4 Claims, 4 Drawing Figures

PATENTED MAR 13 1973 3,720,322

INVENTOR.
JOHN F. HARMS
BY Hugh A. Kirk
ATTORNEY

UPFLOW CARTRIDGE FILTER APPARATUS

BACKGROUND OF THE INVENTION

Heretofore, the common practice in the manufacture of filters having tank-like shells with filter cartridges therein has been to fabricate the tank or shell for the reception of a specially formed member which supports a plurality of individual filter cartridges and positively divides the shell into two sealed apart chambers. These constructions utilized separate upper and lower gaskets to seal such a member between a cover for the tank and the cover. Where removable mountings for the filter cartridge per se have been provided, these constructions have been complicated by additional means such as a separate hold down plate for the filter cartridges, all of which reduce the efficient functioning of a pressure filter.

The instant invention eliminates the foregoing and other drawbacks of the prior art by providing (1) a simple, efficient sealing and holding means between a cartridge support and dividing plate, cover and filter shell, and (2) a cartridge filter cluster which can be easily removed and cleaned as a unit.

SUMMARY OF THE INVENTION

Generally speaking, the present invention comprises an upright cylindrical casing or tank in which are positioned a plurality of tubular or cylindrical filter cartridges through which water from a swimming pool is forced from the exterior to the interior of the cartridges. Water enters the tank adjacent the bottom of the tank in one chamber and is discharged from another chamber at the top, the discharge outlet being formed by a tube or pipe passing through the one or lower tank from an aperture in the plate so that the plate and filter cartridges attached thereto may be removed without disturbing the outlet piping. A unique mounting and sealing arrangement supports the plate in the tank and seals the two chambers. Thus the filter cartridges may be removed as a cluster unit for easy cleaning with a hose. These filter cartridges have a central, rigid perforated tubular core surrounded by a pleated paper filter medium formed into a sleeve with the opposite ends of the core and sleeve being embedded in centrally apertured plastic disks. One or more of these cartridges are then placed on a perforated tube suspended from the apertured plate into the one or lower chamber and are clamped against this plate by a screw cap over the other end of this tube.

OBJECTS AND ADVANTAGES

It is an object of this invention to simplify the mounting and sealing of a filter support plate within a pressure vessel and to provide a readily removable and replaceable filter cartridge cluster.

Another object is to reduce the labor involved in removing, cleaning and/or replacing filter cartridges with respect to their mounting plate.

BRIEF DESCRIPTION OF THE DRAWINGS

The above mentioned and other features, objects and advantages, and a manner of attaining them are described more specifically below by reference to one embodiment of the invention shown in the accompanying drawing, wherein.

DETAILED DESCRIPTION OF A PREFERRED EMBODIMENT

Figure 3:
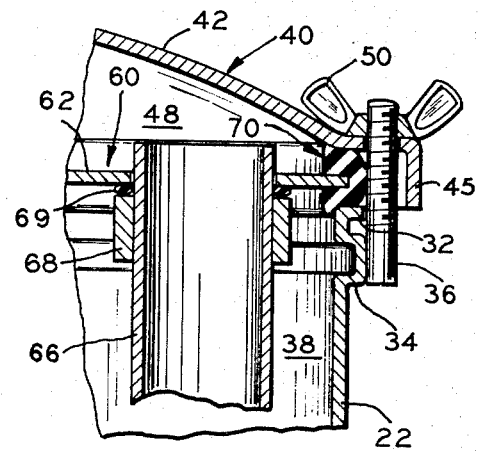
FIG. 3 is an enlarged fragmentary sectional view similar to part of FIG. 2, showing the compressed state of the gasket.
Figure 1:
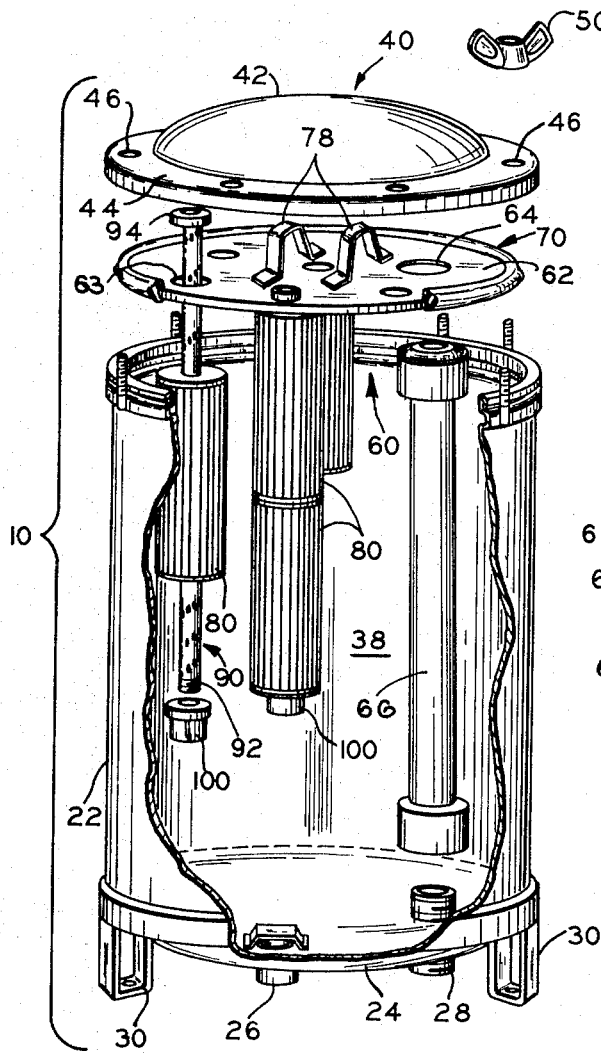
FIG. 1 is an exploded perspective view showing the relationship of the tank, cover, and apertured plate supporting a cluster of filter cartridges of a filter apparatus according to this invention.
Figure 2:
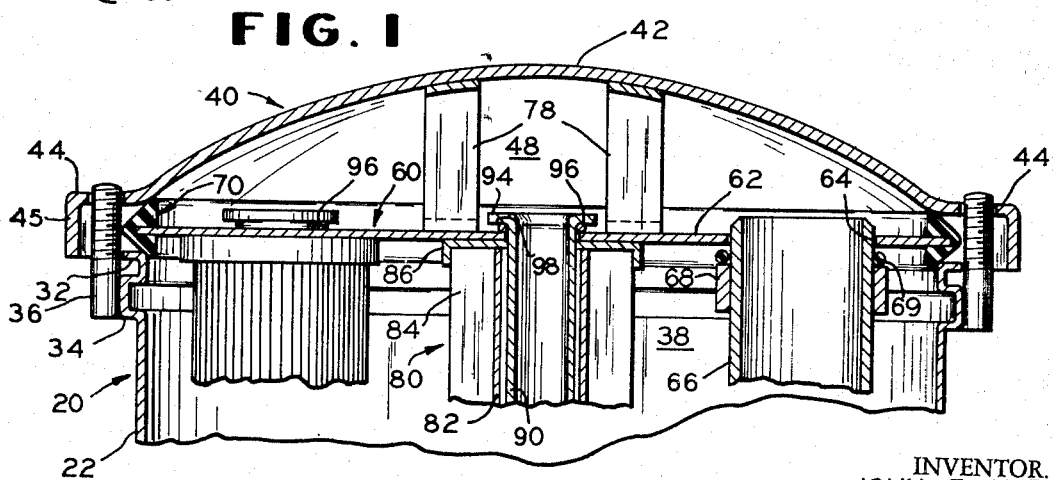
FIG. 2 is an enlarged fragmentary vertical sectional view showing the upper portion of the pressure vessel filter unit before the gasket is compressed around the apertured filter supporting plate.

As shown in FIGS. 1, 2 and 3, the filter apparatus 10 may comprise a vertical cylindrical two chambered pressure vessel or casing 20 made of a material resistant to corrosion, and a unitary filter assembly 60, having a plurality of tubular filter cartridges or elements 80, disposed in the interior thereof and separating the two chambers.

1. The Pressure Vessel

The pressure vessel 20 is preferably constructed of two secured together sections comprising an open top, larger lower section 22 and a smaller upper domed cover section 40. The lower closed end 24 of the section 22 is provided with an inlet port 26, which also may be used as a drain port, and an outlet port 28. This closed end 24 may be provided with a plurality of legs or feet 30 apertured at their lower flanged ends to receive fasteners (not shown) so that the apparatus 10 may be secured to a supporting structure.

Adjacent the open top end of the tank section 22 there is provided a horizontal flange 32 and a bolting ring or flange 34 which ring is provided, such as by welding, with a plurality of vertical upwardly extending studs 36.

The cover 40 having a configuration conforming to the upper open end of the section 22 is removably secured thereto. The center portion 42 of cover 40 is generally dome-shaped and its marginal periphery 44 is generally horizontal to overlie the flange 32 of the lower section 22, and may also have a downwardly extending flange portion 45. This horizontal flange portion 44 is provided with a plurality of apertures 46 to receive the studs 36, and then the cover 40 may be secured in position by means of wing nuts 50.

2. The Chamber Separating Plate

The unit filter device 60 separates the opposed open ends of these vessel sections 22 and 40 into two chambers 38 and 48, respectively. Specifically an apertured partition or filter supporting plate 62 divides the interior of the vessel 20 into the lower contaminated liquid inlet chamber 38 and the upper filtrate outlet chamber 48. The apertured plate 62 is provided with an outlet port 64 which coincides with the upper end of a, preferably plastic, pipe 66 which passes through the inlet chamber 38 for connection to the outlet port 28. To effectively seal the upper end of the outlet pipe 66 to the apertured plate 62 and yet provide for easy removal of the domed cover section 40 and filter device 60, the upper end of the pipe 66 projects into the aperture 64, and just below this end there is provided a flanged shoulder 68 on the pipe 66 on which shoulder 68 rests and O-ring type seal 69 engageable with the lower face of the plate 62.

Figure 4:
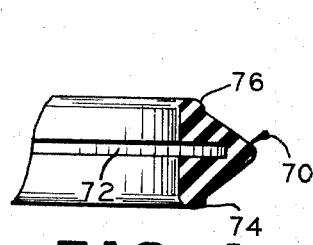
FIG. 4 is a further enlarged fragmentary cross-sectional view of the gasket shown in FIGS. 2 and 3.

The outer peripheral margin of the plate 62 is clamped between the flanges 32 and 44 of sections 22 and 40, respectively, see FIGS. 2 and 3, by means of a ring gasket 70 having a substantially slit triangular or V-shaped cross-section. This ring gasket 70 (see FIG. 4) is provided with a slot 72 around its inner periphery which slot 72 receives the peripheral edge of the plate 62. This gasket 70 is provided with lower and upper flanged portions 74 and 76, respectively, which seat, as shown in FIG. 2, on the inner facing surfaces of the flanges 32 and 44 before the domed cover 40 is secured to the lower section 22. As shown in FIG. 3 when the cover 40 is tightly pulled down onto the lower section 22 by the wing nuts 50, the gasket 72 is compressed and completely seals the two chambers 38 and 48 as well as seals and holds the apertured plate 62. This construction provides a simple but yet effective releasable fluid tight joint between these two chambers and also provides easy removal of the filter device 60 for cleaning and/or filter cartridge replacement.

Also the marginal edges around the aperture 64 in the plate 62 are pushed down to compress the O-ring 69 and seal the joint between the pipe 68 and the aperture 64. In this regard the center portion of the plate 62 may be provided with one or more upwardly projecting handles 78 which engage the inner face of the domed portion 42 of the cover 40. These handles 78 facilitate the removal of the filter device 60, prevent buckling or flexing of the plate 62, and insure the sealing of the outlet port 64 to the upper end of the pipe 66.

3. The Filter Elements and Their Mounting

The type of filter cartridges 80 contemplated for use in this filter apparatus 10 may comprise a central rigid perforated tubular core 82 surrounded by a pleated paper filter element 84 formed into a sleeve, the opposite ends of the core and the paper sleeve being embedded in plastic disks 86 centrally apertured to receive locating and mounting means when in the vessel 20.

To install and properly position the cartridges 80 in the vessel 20, the vessel 20 may be of a vertical height to accommodate one or more layers of cartridges 80. As shown in FIG. 1 each one of the filter elements comprises one or more cartridges 80 telescopically mounted on a rigid perforated tubular connecting rod 90, preferably of plastic, having a lower threaded end 92 and an upper flanged supporting end 94. These tubular connecting rods 90 as shown in FIG. 1 are disposed in each of the apertures 63 of the plate 62 and depend into the lower chamber 38 of the pressure vessel 20. Beneath their flanges 94 there are provided resilient O-ring type gaskets 96, and these flanges 94 may have on their axial inner face grooves 98 in which these O-rings seat. An internally threaded plastic pipe cap 100 is secured to the threaded bottom end 92 of each connecting rod 90, and each rod is of such a length that when the cap 100 is tight, the plastic ends 86 of the cartridges 80 adjacent the plate 62 and each other seat and seal the cartridges 80 together. Thus each O-ring 96 reacts on its connecting rod 90 to retain the assembly of cartridges 80 in a sealed engagement to form each depending filter element.

While there is described above the observed principles of this invention in connection with specific apparatus, it is to be clearly understood that there may be many unobserved side effects which contribute substantially to the efficiency of this device and that this description is made only by way of example and not as a limitation to the scope of this invention.

I claim:
1. A fluid cartridge comprising:
   A. a vessel having an open end and a removable dome-shaped cover for the open end,
   B. a single supporting plate for filter cartridges having apertures therein and being removable with the cartridges thereon as a unit and clampable at its edges between said open end and said cover, said unit comprising:
      1. a continuous resilient gasket of V-shaped cross section overlapping both sides and surrounding the peripheral edge of said edges of said plate for sealing said cover, plate, and open end of said filter,
      2. a plurality of perforated tubes being flanged at one end and threaded at the other, held by their flanges in all but one of the apertures in said plate,
      3. filter cartridges mounted on said tubes,
      4. threaded caps for the other ends of said tubes for clamping said plate between said cartridges and said flanged ends of said tubes, and
      5. lifting means mounted on said plate and engaging the inside of said dome-shaped cover,
   C. an outlet duct having one end thereof extending freely through said one aperture in said plate and having its other end attached to an outlet in the closed end of said vessel, said duct having a shoulder and gasket near its said one end adjacent said plate on the opposite side of said plate from said lifting means whereby said gasket is the only means for sealing said outlet duct to said plate and said gasket is held in sealing engagement with said plate by said lifting means, and
   D. an inlet to said vessel.

2. A cartridge filter according to claim 1 wherein said vessel and said cover have cooperating flanges and bolt means for clamping said flanges together.

3. A cartridge filter according to claim 1 wherein said plate divides said filter into two chambers, one in said vessel and the other in said dome-shaped cover.

4. A cartridge filter according to claim 1 wherein said perforated tubes have gaskets between their flanged ends and the apertures in said plate through which said tubes extend.

* * * * *